United States Patent
Park et al.

(10) Patent No.: US 8,516,231 B2
(45) Date of Patent: Aug. 20, 2013

(54) INTERRUPT HANDLING APPARATUS AND METHOD FOR EQUAL-MODEL PROCESSOR AND PROCESSOR INCLUDING THE INTERRUPT HANDLING APPARATUS

(75) Inventors: Il-hyun Park, Yongin-si (KR); Soo-jung Ryu, Cheonan-si (KR); Dong-hoon Yoo, Seoul (KR); Yeon-gon Cho, Hwaseong-si (KR); Bernhard Egger, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 12/695,266

(22) Filed: Jan. 28, 2010

(65) Prior Publication Data
US 2010/0223449 A1    Sep. 2, 2010

(30) Foreign Application Priority Data
Feb. 27, 2009    (KR) .................. 10-2009-0017028

(51) Int. Cl.
*G06F 15/00*    (2006.01)
*G06F 9/00*    (2006.01)
*G06F 9/44*    (2006.01)

(52) U.S. Cl.
USPC ........................................ 712/244

(58) Field of Classification Search
None
See application file for complete search history.

(56) References Cited

U.S. PATENT DOCUMENTS

| 5,787,303 | A  | * | 7/1998  | Ishikawa ................. 712/24 |
| 6,378,022 | B1 | * | 4/2002  | Moyer et al. .................. 710/260 |
| 6,681,280 | B1 |   | 1/2004  | Miyake et al. |
| 7,447,152 | B2 |   | 11/2008 | Kim et al. |
| 7,581,090 | B2 |   | 8/2009  | Miyake et al. |
| 2004/0128418 | A1 | * | 7/2004 | Abramson et al. ............ 710/260 |

FOREIGN PATENT DOCUMENTS

| KR | 10-1998-0025435 | 7/1998 |
| KR | 10-2001-0082536 | 8/2001 |
| KR | 10-2005-0076158 | 7/2005 |
| KR | 10-2006-0065271 | 6/2006 |
| KR | 10-2008-0041436 | 5/2008 |

* cited by examiner

*Primary Examiner* — Andrew Caldwell
*Assistant Examiner* — George Giroux
(74) *Attorney, Agent, or Firm* — NSIP Law

(57) ABSTRACT

An interrupt support determining apparatus and method for an equal-model processor, and a processor including the interrupt support determining apparatus are provided. The interrupt support determining apparatus determines whether an instruction input to a processor decoder is a multiple latency instruction, compares a current latency of the instruction with a remaining latency if the instruction is a multiple latency instruction, and updates the current latency to the remaining latency if the current latency is greater than the remaining latency.

12 Claims, 3 Drawing Sheets

INTERRUPT HANDLING APPARATUS AND METHOD FOR EQUAL-MODEL PROCESSOR AND PROCESSOR INCLUDING THE INTERRUPT HANDLING APPARATUS

CROSS-REFERENCE TO RELATED APPLICATION

This application claims the benefit under 35 U.S.C. §119(a) of Korean Patent Application No. 10-2009-17028, filed on Feb. 27, 2009 in the Korean Intellectual Property Office, the disclosure of which is incorporated by reference in its entirety for all purposes.

BACKGROUND

1. Field

The following description relates to a pipeline processor, and more particularly, to interrupt handling for an equal-model processor.

2. Description of the Related Art

A pipeline processor processes an instruction with multiple operations, for example, fetching, decoding, execution, write-back, and the like. As a pipeline processor can execute a plurality of instructions, including when the instructions overlap with each other during the multiple operations, the pipeline processor can achieve a relatively high-speed processing of instructions.

Pipeline processors include an equal-model processor and a Less-Than-or-Equal (LTE)-model processor. In both an equal-model processor and an LTE-model processor, maximum latencies for instructions are implemented. The maximum latency of each instruction varies depending on the type of processor. A compiler of the processor discerns the maximum latency of each instruction, and schedules the instruction according to, in part, the maximum latency.

The term 'maximum latency' is described as the upper limit of an amount of time for executing an operation corresponding to an instruction and writing the result of the execution in a target register. In an equal-model processor, the execution result of an instruction is written in a target register only after the maximum latency has elapsed. However, in an LTE-model processor, the execution result of an instruction may be written in a target register before the maximum latency elapses.

Accordingly, an equal-model processor provides flexible scheduling through multiple allocations of registers, since the execution results of instructions are not written in target registers until the maximum latencies elapse. However, an LTE-model processor is limited with respect to multiple allocations of registers, since the execution results of instructions may be written in target registers before the maximum latencies elapse.

In order for an equal-model processor to process an interrupt every cycle, a relatively complicated algorithm or apparatus is required. More specifically, an equal-model processor schedules instructions according to, in part, the maximum latencies of the instructions. When is handling an interrupt while processing scheduled instructions, the processing of the scheduled instructions is delayed by the amount of time used to handle the interrupt. Here, the scheduled instruction may be an instruction scheduled according to an assumption that the execution result of the previous instruction has yet not been reflected. If the latency of the previous instruction elapses while the interrupt is processed, the value of the corresponding target register may be changed. If an instruction scheduled according to the assumption that the execution result of the previous instruction has not yet been reflected is received, an erroneous execution may occur when the received instruction is executed. Accordingly, a relatively complicated apparatus for preventing such erroneous execution may be needed in order for the equal-model processor to handle interrupts every cycle.

In order to prevent programs from operating erroneously in an equal-model processor, a method has been proposed to allow processing of an interrupt only with respect to specific instructions. A conventional method provides processing of an interrupt only when processing instructions that do not to cause errors during execution of the instructions, such as erroneous execution when interrupts are processed. The conventional method reduces erroneous execution of programs by allowing processing of an interrupt only when processing specific instructions, such as a branch instruction, scheduled according to an assumption that the maximum latency of the previous instruction has elapsed.

The conventional method helps reduce erroneous execution, but includes a disadvantage in that it cannot quickly process an interrupt and further may not be able to process any interrupt for an extended period of time. Instructions that are unlikely to cause errors when an interrupt is processed during execution of instructions are limited to only certain instruction types, such as 'branch', 'jump', and 'function-call'. As a result of this limitation, it is possible that an interrupt is not processed for several hundreds or thousands of cycles. Moreover, since most is interrupts require prompt processing, a long time delay may deteriorate the performance of the processor.

SUMMARY

In one general aspect, an interrupt support determining apparatus for an equal-model processor includes a remaining latency update unit to compare a current latency with a remaining latency and to set the remaining latency to the current latency in response to the current latency being greater than the remaining latency, and an interrupt support determining unit to output a signal indicating if processing of an interrupt is allowed, wherein allowing processing of the interrupt is determined according to the remaining latency.

The interrupt support determining unit may output a flag indicating that processing of an interrupt is not allowed if the remaining latency is greater than '1', and the interrupt support determining unit may output a flag indicating that processing of an interrupt is allowed if the remaining latency is equal to or less than '1'.

The interrupt support determining apparatus may further include a latency determining unit to determine whether the current latency is greater than '1', wherein the remaining latency update unit updates the remaining latency to the current latency if the latency determining unit determines that the current latency is greater than '1'.

The interrupt support determining apparatus may be implemented as a latency check logic installed in an instruction decoder of the equal-model processor.

In another general aspect, a method of determining whether or not processing of an interrupt is allowed includes comparing a current latency with a remaining latency; setting the remaining latency to the current latency in response to the current latency being greater than the remaining latency; and determining if processing of an interrupt is allowed, according to the is remaining latency.

In the determining if processing of an interrupt is allowed, processing of an interrupt may not be allowed if the updated remaining latency is greater than '1', and processing of an interrupt may be allowed if the updated remaining latency is equal to or less than '1'.

The method may further include, prior to comparing the current latency with the remaining latency, determining whether the current latency is greater than '1', wherein the comparing of the current latency with the remaining latency is performed when the current latency is greater than '1', and the determining on whether or not processing of an interrupt is allowed is performed when the current latency is equal to or less than '1'.

In another general aspect, an equal-model processor includes an interrupt support determining apparatus, an interrupt generating apparatus, and an interrupt handling apparatus. The interrupt support determining apparatus determines if processing of an interrupt is allowed according to a remaining latency, and outputs a first signal indicating the result of the determination. The interrupt generating apparatus determines if a processor core processes an interrupt in response to a received interrupt request signal and outputs a second signal indicating the result of the determination. The interrupt handling apparatus processes the interrupt in response to the first signal indicating that the processing of an interrupt is allowed and the second signal indicating that the processor core processes the interrupt.

The interrupt support determining apparatus may be implemented in an instruction decoder of the processor core.

The interrupt support determining apparatus may include a latency determining unit to determine if a current latency of an instruction input to the instruction decoder is greater than '1', a remaining latency determining unit to compare, in response to the latency determining unit determining that the current latency is greater than '1', the current latency with the remaining latency, and to update the remaining latency to the current latency in response to the current is latency being greater than the remaining latency, and an interrupt support determining unit to determine whether or not the processing of an interrupt is allowed, according to the remaining latency.

The interrupt support determining unit may determine whether or not the processing of an interrupt is allowed according to the updated remaining latency, in response to the remaining latency update unit updating the remaining latency to the current latency.

The equal-model processor may further include a logic gate to receive the first signal and the second signal, the output signal of the logic gate being input to the interrupt handling apparatus, wherein the logic gate is an AND gate if the first signal and the second signal are active high signals, and the logic gate is an OR gate if the first signal and the second signal are active low signals.

In another general aspect, an equal-model processor includes a plurality of interrupt support determining apparatuses, an interrupt generating apparatus, and an interrupt handling apparatus. The plurality of interrupt support determining apparatuses each determine whether or not processing of an interrupt is allowed, according to a corresponding remaining latency, and output a first signal indicating the result of the determination. The interrupt generating apparatus determines if a process core processes an interrupt in response to a received interrupt request signal, and outputs a second signal indicating the result of the determination. The interrupt handling apparatus processes the interrupt in response to the first signal output from each interrupt support determining apparatus indicating that the processing of an interrupt is allowed and the second signal indicating that the processor core processes the interrupt.

The equal-model processor may further include a plurality of functional units, wherein the plurality of interrupt support determining apparatuses are each respectively included in instruction decoders of the plurality of functional units.

Each of the plurality of interrupt support determining apparatuses may include a latency is determining unit to determine if a current latency of an instruction input to the instruction decoder is greater than '1', a remaining latency update unit to compare, in response to the latency determining unit determining that the current latency is greater than '1', the current latency with the remaining latency, and to update the remaining latency to the current latency in response to the current latency being greater than the remaining latency, and an interrupt support determining unit to generate the first signal.

In another general aspect, an interrupt handling method for an equal-model processor includes controlling the equal-model processor to process an interrupt, in response to a latency of a current instruction input to an instruction decoder of the equal-model processor being '1' and a remaining latency for a previous instruction being equal to or less than '1'.

The equal-model processor may further include a plurality of functional units, and each of the plurality of functional units executes the interrupt handing method.

Other objects, features and aspects will be apparent from the following description, the drawings, and the claims.

BRIEF DESCRIPTION OF THE DRAWINGS

Unless otherwise described, elements, features, and structures are denoted by the same reference numerals throughout the drawings and the description, and the size and proportions of some elements may be exaggerated in the drawings for clarity, illustration, and convenience.

DETAILED DESCRIPTION

The following description is provided to assist the reader in gaining an understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions may be omitted to increase clarity and conciseness.

Figure 1:
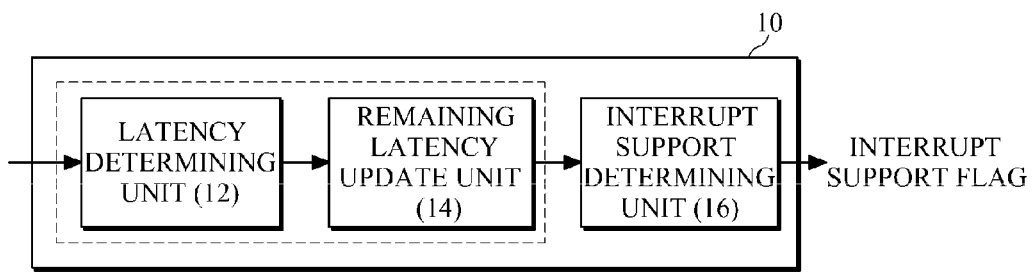
FIG. 1 is a block diagram illustrating an example of an interrupt support determining apparatus.

FIG. 1 illustrates an interrupt support determining apparatus 10. Here, the phrase 'interrupt support determining apparatus' is an expression selected for convenience of description. The interrupt support determining apparatus 10 is an apparatus for implementing logic for execution of an interrupt support determining method associated with interrupt handling for an equal-model processor. In a broad sense, interrupt support determining apparatus is an interrupt handling apparatus. In the description, the use of the term 'interrupt support determining apparatus' is intended to distinguish the described examples from conventional interrupt handling apparatuses.

The interrupt support determining apparatus 10 determines whether to allow a processor to process an interrupt when a received instruction is executed, with respect to a remaining latency. The interrupt support determining apparatus 10 informs the processor of the result of the determination. The remaining latency is a value which is set according to the maximum latency of the received instruction and/or the maximum latencies of previously received instructions. The interrupt support determining apparatus 10 determines whether to allow the processor to process an interrupt when a received instruction is executed, by comparing a latency of the received instruction with a remaining latency. The remaining latency is updated to be the greater of the two latencies, as determined by the comparison. Accordingly, the interrupt support determining apparatus 10 may be implemented as a latency check logic. The interrupt is support determining apparatus 10 may also be implemented as a hardware logic configured in an instruction decoder of a reconfigurable processor, among other implementations.

Referring to FIG. 1, the interrupt support determining apparatus 10 includes a latency determining unit 12, a remaining latency update unit 14, and an interrupt support determining unit 16.

The latency determining unit 12 determines whether an instruction to be executed has a latency value of 2 or more (hereinafter, the latency of the instruction to be executed will be referred to as a current latency). That is, the latency determining unit 12 determines whether an instruction input to the instruction decoder has a latency value of 2 or more. An instruction having a latency value of 2 or more will hereinafter be referred to as 'a multiple latency instruction'. To determine the latency value, a value indicating the type of the instruction to be executed or a current latency value is input to the latency determining unit 12. However, the determination of the latency value may be implemented according to other methods.

In the equal-model processor, the latencies of individual instructions are set in advance, and how long latencies are assigned to the individual instructions may vary according to the type of the processor. For example, the latency of each instruction may be set to '1' or more if execution of the instruction consumes one or more cycles. The latencies of individual instructions may be set to appropriate values. For example, an instruction 'load' is allocated a latency of 4, an instruction 'multiple (MULT)' is allocated a latency of 2, and other instructions, for example 'ADD' or 'subtract (SUB)', are allocated a latency of '1'. However, the latency values described are only suggested as examples.

According to another example, latencies may be set to have values of 0 or more. An implementation with a minimum latency of '1' and an implementation with a minimum latency of '0' do not have substantial differences. Regardless of methods of setting latencies, setting the latency of an instruction to a 'minimum latency' indicates writing the execution result of an is instruction in a corresponding register following execution of the instruction. In the following description, a minimum latency is '1' is described; however, the minimum latency may be instead set to '0'.

According to another example, when the instruction to be executed has a latency of 2 or more, the latency determining unit 12 may transfer the latency value to the remaining latency update unit 14. Alternatively, the remaining latency update unit 14 may identify a current latency according to the type of the instruction. If the current latency is '1', the value may not be transferred to the latency update unit 14. However, the current latency '1' may also be transferred to the remaining latency update unit 14, to update the remaining latency.

The remaining latency update unit 14 compares the current latency with the remaining latency. If the current latency is greater than the remaining latency, the remaining latency update unit 14 updates the remaining latency to the current latency. Here, the remaining latency is a value less by 1 than the remaining latency for the previous instruction, wherein the value '1' corresponds to a cycle difference between one instruction and a previous instruction. For example, when the current latency is '4' and the remaining latency is '2', the remaining latency update unit 14 updates the remaining latency to '4'. However, if the current latency is equal to or less than the remaining latency, the remaining latency is not updated.

The interrupt support determining unit 16 determines whether to allow the equal-model processor to process an interrupt immediately. The interrupt support determining unit 16 also creates and outputs an interrupt support flag for indicating the result of the determination, to wherein the phrase 'interrupt support flag' is an expression selected for convenience of description. Here, the interrupt support determining unit 16 may be considered an 'interrupt support flag generator'. The value of the interrupt support flag may be set to be an appropriate value. For example, the interrupt support flag may be an active high signal set to '1' when interrupt is supported and reset to '0' when interrupt is not supported. However, the interrupt is support flag may also be an active low signal.

If the remaining latency is '1' or less, the interrupt support determining unit 16 generates and outputs an interrupt support flag having, for example, a value of '1' which allows the equal-model processor to process an interrupt. Meanwhile, if the remaining latency exceeds '1', the interrupt support determining unit 16 generates and outputs an interrupt support flag having, for example, a value of '0' which does not allow the equal-model processor to process an interrupt.

If the remaining latency exceeds '1', the execution result of at least one of the previous instructions is not yet written in a correspond register. Here, the instruction may be an instruction scheduled according to the assumption that the execution results of the previous instructions have not yet been written in corresponding registers. When the remaining latency exceeds '1' and the interrupt support determining unit 16 allows the processor to execute a following instruction after processing an interrupt, the instruction scheduled under the assumption that the execution result of the previous instruction has not been reflected is executed. However, the instruction is executed in the state that the execution result of the previous instruction has already been reflected, which may produce erroneous execution.

To resolve the above problem, when an instruction having a latency of '1' or more is input to the decoder, the latency is compared with a remaining latency, and the remaining latency is updated to the current latency. If the updated remaining latency is greater than '1', processing of an interrupt is not allowed. If the updated remaining latency is '1' or less, processing of an interrupt is allowed. If processing of an interrupt is allowed only when a current latency is '1' or less and a remaining latency is '1' or less, a following instruction is an instruction scheduled under the assumption that the execution results of the previous instructions have already been written in the corresponding registers. Accordingly, the instruction can be safely executed after an interrupt is processed, without facilitating erroneous execution.

Also, although an instruction to be executed may not necessarily be an instruction type is (for example, 'branch', 'jump', 'function-call', and the like) having error prevention characteristics, the processor can be allowed to process an interrupt by checking a remaining latency to determine whether the remaining latency meets a predetermined condition. Accordingly, the processing frequency and speed of interrupt may be improved, thereby preventing a relatively long delay in interrupt processing.

For convenience of description, the interrupt support determining apparatus 10 is illustrated as being divided into three blocks in FIG. 1. Accordingly, the interrupt support determining apparatus 10 may have various configurations that allow execution of the same functions. For example, as denoted by a dotted line in FIG. 1, the latency determining unit 12 and remaining latency update unit 14 can be illustrated to be a single functional block. Here, the functional block (for example, it can be referred to as a 'remaining latency update unit'), as indicated by the dotted line, performs a function of checking whether a multiple latency instruction is input to a decoder, determining, if a multiple latency instruction is input to the decoder, whether a current latency is greater than a remaining latency, and updating the remaining latency to the current latency if the current latency is greater than the remaining latency.

Figure 2:
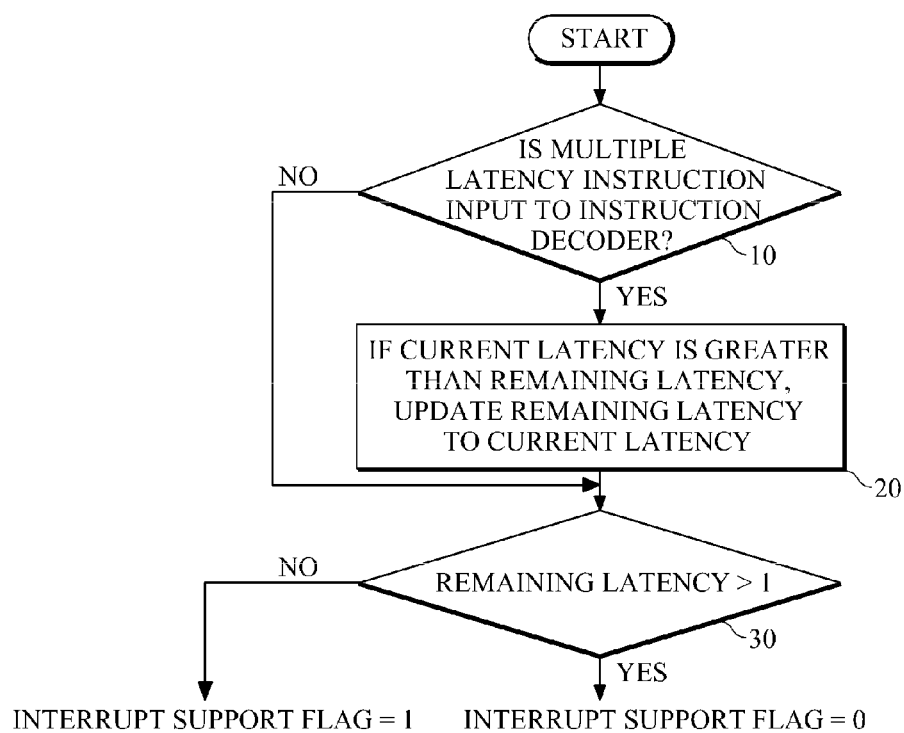
FIG. 2 is a flowchart illustrating an example of an interrupt support determining method.

FIG. 2 illustrates a flowchart of an example of an interrupt support determining method. The interrupt support determining method illustrated in FIG. 2 may be performed by the interrupt support determining apparatus 10 shown in FIG. 1. Various elements are omitted in the following description, to avoid reiteration, and may be understood according to the above to descriptions with reference to FIG. 1.

Referring to FIG. 2, it is determined whether a multiple latency instruction is input to an instruction decoder (operation 10). If it is determined that a latency having a value of '1' or more is input, the latency is compared with a remaining latency and the remaining latency is updated to the greater value of the latencies (operation 20). That is, if the input latency is (referred to hereinafter as a current latency) is greater than the remaining latency, the remaining latency is updated to the value of the current latency. If an instruction having a latency of '1' is input to the instruction decoder, updating of the remaining latency may be omitted. It is determined whether the remaining latency is greater than '1' (operation 30). The remaining latency may be the value updated in operation 20 or a value resulting from subtracting '1' from a remaining latency for the previous instruction, due to one cycle having elapsed. If it is determined that the remaining latency is greater than '1', an interrupt support flag having a value of '0' is generated and output. Meanwhile, if the remaining latency is equal to or less than '1', an interrupt support flag having a value of '1' is generated and output.

Table 1 shows a scenario according to the above example. In Table 1, an instruction 'LOAD' is allocated a latency of '4', an instruction 'MULT' is allocated a latency of '2', and instructions 'ADD', 'SUB', 'STORE', and the like are allocated a latency of '1'. In this example, it is assumed that a remaining latency is '2' and a value of an interrupt support flag is '0' when the instruction 'LOAD' is input. Also, an active high signal is used as an interrupt support flag.

TABLE 1

| Instruction | Remaining Latency | Interrupt Support Flag |
|---|---|---|
| LOAD | 4<br>(updated to the latency value of the LOAD instruction) | 0<br>(remaining latency 4 (>1)) |
| ADD | 3<br>(no updating) | 0<br>(remaining latency 3 (>1)) |
| SUB | 2<br>(no updating) | 0<br>(remaining latency 2 (>1)) |
| STORE | 1<br>(no updating) | 1<br>(remaining latency 1 (≦1)) |

TABLE 1-continued

| Instruction | Remaining Latency | Interrupt Support Flag |
|---|---|---|
| SUB | 1<br>(updated to the latency value of the SUB instruction) | 1<br>(remaining latency 1 (≦1)) |
| MULT | 2<br>(updated to the latency value of the MULT instruction) | 0<br>(remaining latency 2 (>1)) |
| NOP | 1<br>(no updating) | 1<br>(remaining latency 1 (≦1)) |

A conventional method of determining whether to process an interrupt according to the type of instruction to be executed cannot process interrupts when instructions, such as 'STORE', 'SUB', 'NOP', and the like are executed, since there is a possibility of erroneous execution occurring. However, according to the above example, as described with respect to Table 1, the processor can process interrupts even when instructions, such as 'STORE', 'SUB', 'NOP', and the like are input to the instruction decoder. According to the above example, the equal-model processor can rapidly respond to interrupt requests as it can handle interrupts over short time intervals.

According to the above example, an interrupt may not be processed when a remain latency is greater than '1'. However, an interrupt may be processed without causing erroneous execution to occur even when a remain latency is greater than '1'.

According to the above example, coverage of interrupt processing may be significantly extended through relatively simple hardware logic. Although full coverage cannot be guaranteed, the above example reduces an interval during which interrupt can be processed from is several hundreds or thousands of cycles to several cycles.

Figure 3:
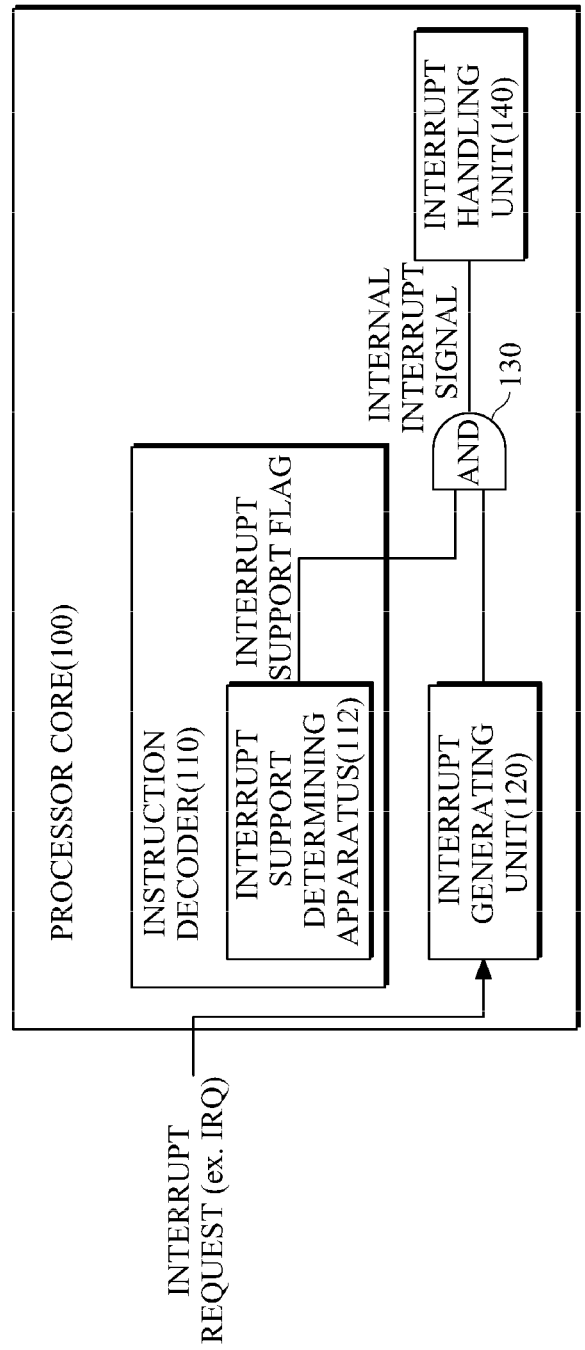
FIG. 3 is a block diagram illustrating an example of an equal-model processor.

FIG. 3 illustrates an equal-model processor according to one example. A processor core 100 of the equal-model processor illustrated in FIG. 3 includes a single functional unit. FIG. 3 only illustrates components and signals for description of the operation of the equal-model processor; however, it will be appreciated that the equal-model processer may be implemented with various additional components and signals further to the illustrated components and signals.

Referring to FIG. 3, the processor core 100 includes an instruction decoder 110, an interrupt generating unit 120, an AND gate 130, and an interrupt handling unit 140. The processor core 100 further includes an interrupt support determining apparatus 112. In FIG. 3, the interrupt support determining apparatus 112 is included in the instruction decoder 110 of the processor core 100; however, this configuration is only provided as one example.

The instruction decoder 110 decodes instructions received from an instruction patch unit (not shown). The function and operation of the instruction decoder 110 may be similar to a conventional instruction decoder, except that the instruction decoder 110 may further include the interrupt support determining apparatus 112 for outputting an interrupt support flag having a value of '0' or '1' according to a remaining latency. The interrupt support determining apparatus 112 may be implemented as the interrupt support determining apparatus 10 illustrated in FIG. 1.

The interrupt generating unit 120 determines whether the processor core 100 can process an interrupt in response to an interrupt request signal IRQ, thus outputting the result of the to determination. Here, the type of the interrupt request signal IRQ is not particularly limited. The 'interrupt generating unit' is an expression selected to distinguish it from the interrupt handling unit 140, and in a broad sense, may be a subunit of the interrupt handling unit 140.

The interrupt generating apparatus 120 may be implemented as an interrupt handling logic installed in an existing processor core. For example, the interrupt generating apparatus 120 may be hardware logic to determine, when receiving an interrupt request through an external interrupt pin, whether to execute an interrupt instruction requested by a processor core, according to a predetermined algorithm. The interrupt generating apparatus 120 may output an interrupt signal to the interrupt handling unit 140 according to the result of the determination.

The AND gate 130 performs an AND operation on the outputs of the interrupt support determining apparatus 112 and interrupt generating unit 120, and performs the result of the AND operation as an internal interrupt signal to the interrupt handling unit 140. Accordingly, the AND gate 130 outputs, when the output values of the interrupt support determining apparatus 112 and interrupt generating unit 120 are '1', an internal interrupt signal instructing the interrupt handling unit 140 to process an interrupt. As an example, the AND gate 130 is logic gate which outputs an internal interrupt signal to the interrupt handling unit 140 only when both the interrupt support determining apparatus 112 and the interrupt generating unit 120 output a signal supporting an interrupt. If flags or signals output from the interrupt support determining apparatus 112 and interrupt generating unit 120 are active low signals, an OR gate, instead of the AND gate 130, may be used.

The interrupt handling unit 140 allows the processor core 100 to perform predetermined processing in response to an internal interrupt signal. The interrupt handling apparatus 140 changes a program counter (PC) value to a vector value of an interrupt vector table in response to a received internal interrupt signal. The interrupt handling unit 140 can operate only when both the interrupt support determining apparatus 112 and interrupt generating unit 140 output flags or signals indicating that processing of an interrupt is allowed, that is, only when the AND gate 130 outputs an internal interrupt signal.

Figure 4:
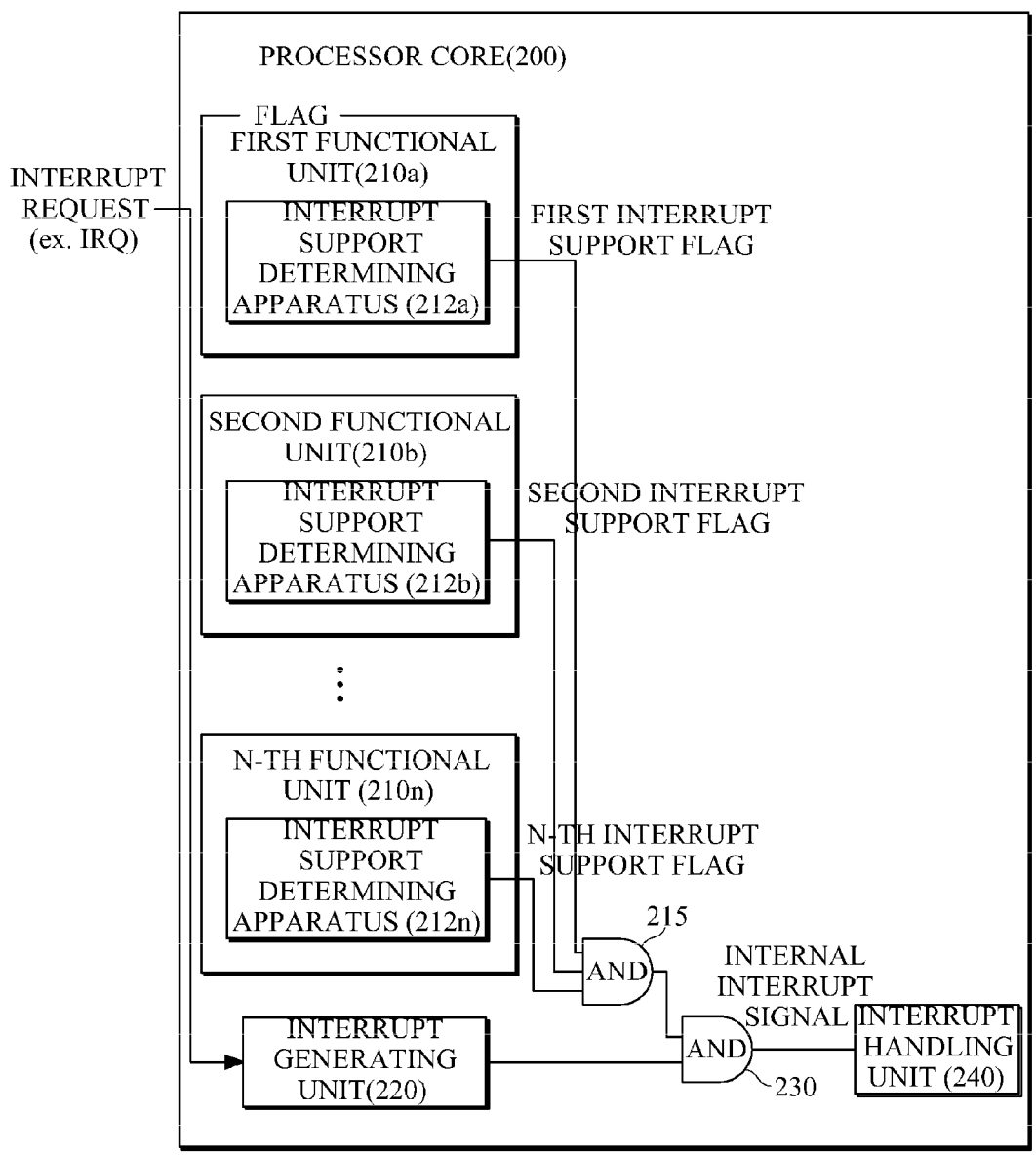
FIG. 4 is a block diagram illustrating an example of an equal-model processor.

FIG. 4 illustrates an equal-model processor according to another example. The equal-model processor illustrated in FIG. 4 may be a processor including multiple functional units, for example, a Very Long Instruction Word (VLIW) or a superscalar. FIG. 4 only illustrates is components and signals for description of the operation of the equal-model processor; however, it will be appreciated that the equal-model processor may be implemented with various additional components and signals further to the illustrated components and signals.

Referring to FIG. 4, a processor core 200 of the equal-model processor includes n functional units 210a, 210b, . . . , 210n, a first AND gate 215, an interrupt generating unit 220, a second AND gate 230, and an interrupt handling unit 240. The interrupt generating unit 220, the second AND gate 230 and an interrupt handling unit 240 generally correspond to the interrupt generating unit 120, the AND gate 130 and the interrupt handling unit 140 illustrated in FIG. 3, respectively. Hereinafter, the equal-model processor illustrated in FIG. 4 will be described with reference to its differences from the equal-model processor illustrated in FIG. 3.

The respective functional units 210a, 210b, . . . , 210n of the equal-model processor respectively include interrupt support determining apparatuses 212a, 212b, . . . , 212n. The interrupt support determining apparatuses 212a, 212b, . . . , 212n each may have a similar function as the interrupt support determining apparatus 10 described above with reference to FIG. 1.

The functional units 210a, 210b, . . . , 210n each determine whether to process an interrupt according to a remaining latency and the predetermined algorithm described above with reference to FIGS. 1 and 2. The interrupt support determining apparatuses 212a, 212b, . . . , 212n may be respectively included in the instruction decoders of the functional units 100a, 100b, . . . , 100n.

The results of the determinations by the interrupt support determining apparatuses 212a, 212b, . . . , 212n are input to the first AND gate 215. The result of the operation by the first AND gate 215 is input to the second AND gate 230. While AND gates 215 and 230 are illustrated as an example, and OR gates may be implemented in place of the AND gates 215 and 230 when interrupt support flags are active low signals.

As such, according to the above example, when it is determined by the AND gate 215 (or an OR gate) that all the results of the determinations by the interrupt support determining apparatuses 212a, 212b, . . . , 212n indicate that processing of an interrupt is allowed, the interrupt handling unit 240 processes interrupt. The process is based on the equal-model processor including multiple functional units. By processing an interrupt after all functional units complete writing of the execution result of an instruction having a multiple latency, erroneous executions may be reduced.

As illustrated in FIG. 4, the first AND gate 215 outputs a value of '1' (in the case of an active high signal) when receiving interrupt support flag signals having a value of '1' from all the interrupt support determining apparatuses 212a, 212b, . . . , 212n. Also, the second AND gate 230 outputs a value of '1' only when receiving signals or flags having a value of '1' from the interrupt generating unit 220 and the first AND gate 215. The first and second AND gates 215 and 230 are illustrated in FIG. 4 as separate elements; however, the first and second AND gates 215 and 230 may be implemented as a single unit.

As described above, although an instruction to be executed may not be an instruction type having error prevention characteristics (for example 'branch', 'jump', 'function-call', and the like), the processor can process an interrupt by checking a remaining latency to determine whether the remaining latency meets a predetermined condition. Accordingly, the processing frequency and speed of interrupt may be improved, such that relatively long delays in interrupt processing may be avoided. Also, since an interrupt can be processed only when a latency of a current instruction is '1' and a remaining latency is equal to or less than '1', that is, only when an updated remaining latency is equal to or less than '1', erroneous executions may be prevented.

The processes, functions, methods and/or software described above may be recorded, stored, or fixed in one or more computer-readable storage media that includes program instructions to be implemented by a computer to cause a processor to execute or perform the is program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interrupt support determining apparatus for an equal-model processor, comprising:
   a remaining latency update unit configured to
      compare a current latency of a current instruction received at a current operation cycle, with a remaining latency of a previous instruction that is set by the remaining latency update unit at a previous operation cycle, and
      update the remaining latency to the current latency if the current latency is greater than the remaining latency; and
   an interrupt support determining unit configured to
      output a flag indicating that processing of an interrupt is not allowed if the updated remaining latency is greater than '1',
      output the flag indicating that processing of an interrupt is allowed if the updated remaining latency is less than or equal to '1', and
      continue to output the flag indicating that processing of an interrupt is not allowed until the updated remaining latency is decremented to be equal to '1',
   wherein the interrupt support determining apparatus is implemented as a hardware logic.

2. The interrupt support determining apparatus of claim 1, further comprising:
   a latency determining unit configured to determine whether the current latency is greater than '1',
   wherein the remaining latency update unit is further configured to update the remaining latency to the current latency only if the latency determining unit determines that the current latency is greater than '1'.

3. A method of determining whether or not processing of an interrupt is allowed, comprising:
   comparing a current latency of a current instruction received at a current operation cycle, with a remaining latency of a previous instruction that is set at a previous operation cycle;
   updating the remaining latency to the current latency if the current latency is greater than the remaining latency;
   determining that processing of an interrupt is not allowed if the updated remaining latency is greater than '1';
   determining that processing of an interrupt is allowed if the updated remaining latency is less than or equal to '1'; and
   continuing to determine that the processing of an interrupt is not allowed until the updated remaining latency is decremented to be equal to '1'.

4. The method of claim 3, further comprising, prior to the comparing of the current latency with the remaining latency:
   determining whether the current latency is greater than '1',
   wherein the comparing of the current latency with the remaining latency is performed if the current latency is greater than '1'.

5. An equal-model processor comprising:
   an interrupt support determining apparatus configured to
      compare a current latency of a current instruction received at a current operation cycle, with a remaining latency of a previous instruction that is set by the interrupt support determining apparatus at a previous operation cycle,
      update the remaining latency to the current latency if the current latency is greater than the remaining latency,
      output a first signal indicating that processing of an interrupt is not allowed if the updated remaining latency is greater than '1',
      output the first signal indicating that processing of an interrupt is allowed if the updated remaining latency is less than or equal to '1', and
      continue to output the first signal indicating that processing of an interrupt is not allowed until the updated remaining latency is decremented to be equal to '1';
   an interrupt generating apparatus configured to determine if a processor core processes an interrupt based on a received interrupt request signal, and output a second signal indicating a result of the determination; and
   an interrupt handling apparatus configured to process the interrupt based on the first signal indicating that processing of an interrupt is allowed and the second signal indicating that the processor core processes the interrupt,
   wherein the interrupt support determining apparatus is implemented as a hardware logic.

6. The equal-model processor of claim 5, wherein the interrupt support determining apparatus is implemented in an instruction decoder of the processor core.

7. The equal-model processor of claim 5, wherein the interrupt support determining apparatus further comprises:
   a latency determining unit configured to determine whether the current latency is greater than '1'; and
   a remaining latency update unit configured to update the remaining latency to the current latency only if the latency determining unit determines that the current latency is greater than '1'.

8. The equal-model processor of claim 5, further comprising:
   a logic gate configured to receive the first signal and the second signal, and output an output signal to the interrupt handling apparatus,
   wherein the logic gate is an AND gate if the first signal and the second signal are active high signals, and the logic gate is an OR gate if the first signal and the second signal are active low signals.

9. An equal-model processor comprising:
   a plurality of interrupt support determining apparatuses, each of the interrupt support determining apparatuses configured to
      compare a current latency of a current instruction received at a current operation cycle, with a remaining latency of a previous instruction that is set by the interrupt support determining apparatus at a previous operation cycle,
      update the remaining latency to the current latency if the current latency is greater than the remaining latency,
      output a first signal indicating that processing of an interrupt is not allowed if the updated remaining latency is greater than '1', output the first signal indicating that processing of an interrupt is allowed if the updated remaining latency is less than or equal to '1', and continue to output the first signal indicating that processing of an interrupt is not allowed until the updated remaining latency is decremented to be equal to '1';

an interrupt generating apparatus configured to determine if a processor core processes an interrupt based on a received interrupt request signal, and output a second signal indicating a result of the determination; and an interrupt handling apparatus configured to process the interrupt based on the first signal output from each of the interrupt support determining apparatuses that indicates that processing of an interrupt is allowed and the second signal indicating that the processor core processes the interrupt, wherein each of the interrupt support determining apparatuses is implemented as a hardware logic.

10. The equal-model processor of claim 9 further comprising:

a plurality of functional units comprising respective instruction decoders, the instruction decoders comprising the respective plurality of interrupt support determining apparatuses.

11. The equal-model processor of claim 9, wherein each of the plurality of interrupt support determining apparatuses further comprises:

a latency determining unit configured to determine whether the current latency is greater than '1'; and a remaining latency update unit configured to update the remaining latency to the current latency only if the latency determining unit determines that the current latency is greater than '1'.

12. The interrupt support determining apparatus of claim 1, wherein the current instruction is a multiple latency instruction.

* * * * *